US010486834B2

(12) United States Patent
Keidar et al.

(10) Patent No.: US 10,486,834 B2
(45) Date of Patent: Nov. 26, 2019

(54) SELF-CONSUMING SATELLITE

(71) Applicant: The George Washington University, Washington, DC (US)

(72) Inventors: Michael Keidar, Baltimore, MD (US); Joel Slotten, Centreville, VA (US)

(73) Assignee: The George Washington University, Washington, DC (US)

( * ) Notice: Subject to any disclaimer, the term of this patent is extended or adjusted under 35 U.S.C. 154(b) by 273 days.

(21) Appl. No.: 15/582,152

(22) Filed: Apr. 28, 2017

(65) Prior Publication Data
US 2017/0313444 A1 Nov. 2, 2017

Related U.S. Application Data

(60) Provisional application No. 62/329,705, filed on Apr. 29, 2016.

(51) Int. Cl.
*B64G 1/24* (2006.01)
*B64G 1/10* (2006.01)
*B64G 1/40* (2006.01)
*B64G 1/44* (2006.01)

(52) U.S. Cl.
CPC .............. *B64G 1/242* (2013.01); *B64G 1/10* (2013.01); *B64G 1/406* (2013.01); *B64G 1/44* (2013.01)

(58) Field of Classification Search
CPC .......... B64G 1/10; B64G 1/242; B64G 1/406; B64G 1/44
See application file for complete search history.

(56) References Cited

U.S. PATENT DOCUMENTS

| | | | | |
|---|---|---|---|---|
| 6,818,853 B1 * | 11/2004 | Schein | .................. | F03H 1/0012 219/121.52 |
| 10,107,271 B2 * | 10/2018 | Keidar | .................. | B64G 1/406 |
| 2007/0295009 A1 * | 12/2007 | Calabro | ................ | B64G 1/402 60/641.15 |
| 2011/0258981 A1 * | 10/2011 | Keidar | .................. | B64G 1/405 60/202 |
| 2017/0191472 A9 * | 7/2017 | Haque | .................. | F03H 1/0018 |
| 2017/0370353 A1 * | 12/2017 | Keidar | ................. | F03H 1/0087 |
| 2018/0244406 A1 * | 8/2018 | Neumann | ............. | F03H 1/0006 |
| 2018/0370659 A1 * | 12/2018 | Keidar | ..................... | B64G 1/40 |

OTHER PUBLICATIONS

U.S. Government Orbital Debris Mitigation Standard Practices, 2015, 3 pages.
CubeSat Design Specification, Rev. 13, The CubeSat Program, Cal Poly SLO, 2014, 42 pages.
Orbital Debris Quarterly News, National Aeronautics and Space Administration, vol. 17, Issue 1, Jan. 2013, 8 pages.
B. Jüttner, et al., "Cathode Spots", 2001, 209 pages.

(Continued)

*Primary Examiner* — Bret Hayes
(74) *Attorney, Agent, or Firm* — Blank Rome LLP

(57) ABSTRACT

A CubeSat satellite has a solar cell and an arc propulsion system. The arc propulsion system includes a power source, a first lead coupled to the power source and to a cathode, and a second lead coupled to the power source and to an anode. The solar cell is used as the cathode of the propulsion system.

16 Claims, 22 Drawing Sheets

(56) References Cited

OTHER PUBLICATIONS

I. I. Beilis, et al., "Vacuum Arc Cathode Spot Grouping and Motion in Magnetic Fields", IEEE Transactions on Plasma Science, vol. 30, No. 6, Dec. 2002, pp. 2124-2132.
R. L. Boxman, "Electrical Discharges and Plasmas—A Brief Tutorial", Part 1—Fundamentals of Vacuum Arc Science and Technology, 1995, 26 pages.
G. Y. Yusbkov, et al., "Ion Veiocities in Vacuum Arc Plasmas", Journal of Applied Physics, vol. 88, No. 10, Nov. 15, 2000, 6 pages.
"Space Debris Mitigation Guidelines of the Committee on the Peaceful Uses of Outer Space", United Nations Office for Outer Space Affairs, 2010, 12 pages.
IADC Space Debris Mitigation Guidelines, Inter-Agency Space Debris Coordination Committee, Sep. 2007, 10 pages.
D. J. Kessler et al., "Collision Frequency of Artificial Satellites: The Creation of a Debris Belt", Journal of Geophysical Research, vol. 83, No. A6, Jun. 1978, pp. 2637-2646.
P. B. de Selding, "1 in 5 Cubesats Violates International Orbit Disposal Guidelines", www.spacenews.com, Jul. 2015, 1 page.

* cited by examiner

SELF-CONSUMING SATELLITE

RELATED APPLICATIONS

This application claims the benefit of U.S. Provisional Application No. 62/329,705, filed Apr. 29, 2016, the entire contents of which are incorporated herein by reference.

BACKGROUND OF THE INVENTION

Field of the Invention

The present invention relates to satellites. More particularly, the present invention relates to self-consuming satellites.

Background of the Related Art

1. The Problem

CubeSats face a significant challenge when it comes to complying with international debris mitigation standards. These standards call for satellites to deorbit within 25 years of completing their mission. Typically this means reducing their altitude to a height that will allow them to deorbit naturally as the result of atmospheric drag. However, CubeSats are frequently placed into orbits above this altitude, and for reasons discussed in the following sections, they are built without propulsion systems. Therefore, they are not able to reduce their altitude at the end of their mission. As a solution to this problem, the present invention provides a self-consuming satellite. This CubeSat uses its external structure as propellant for an electric propulsion system that would meet the stringent requirements placed on CubeSats and allow them to meet debris mitigation guidelines. Initial lab embodiments were prepared and the materials needed for such a concept were examined.

1.1 CubeSat Propulsion

The concept of CubeSats grew out of the desire for low cost access to space and reduced satellite development time, especially by colleges and universities. To facilitate this capability standards were developed collaboratively by Prof. Bob Twiggs at Stanford University and Prof Jordi Puig-Sauri at California Polytechnic State University. Together they developed the standards for a small, simple satellite that could be deployed as a secondary payload using a standard interface known as a Poly-PicoSatellite Orbital Deployer (P-POD) (California Polytechnic State University, 2014)

Under these standards a one unit (1U) CubeSat must be 10 cm×10 cm×10 cm and be no more than 1.33 kg (placing them in the category of nanosatellites rather than picosatellites). 1U CubeSats are frequently used as basic building blocks for creating larger CubeSats up to 27U (3U×3U×3U) (Hevner, Holemans, Puig-Sauri, & Twiggs, 2011), although the P-Pod was only designed to deploy CubeSats up to 3U in size.

Despite the benefits of their low development cost and simplicity, CubeSats face a number of challenges because of their small size. Although a number of new launch providers are targeting CubeSats, in the past they were normally launched as a secondary payload along with a much larger (and higher paying) primary payload. Because the final orbit on these launches is established to meet the requirements of the primary payload, CubeSats are typically placed into orbits that are convenient for the primary payload. As a result CubeSats frequently end up in popular and highly congested orbits. The resulting orbit may be less than optimal for achieving the mission the CubeSat was designed for.

To protect the integrity of the primary payload a number of restrictions were established in the CubeSat standard design. For example, the use of pressurized systems on CubeSats is limited, pyrotechnics are largely prohibited, and toxic or corrosive materials such as certain propellants are discouraged. This severely limits an engineer's options for designing a propulsion system on a CubeSat. Chemical propulsion systems, typically liquid mono- or bi-propellant, are used on many larger satellites to allow them to maintain station or to adjust their orbit. However, most liquid propulsion systems use many of the prohibited items listed above. Pressurized inert gases are used to feed propellant to the combustion chamber. Pyrotechnics are often used to open or close valves in the propellant feed line. Thruster valves, which must be cycled numerous times over their lifetimes, require more power than is generally available from a CubeSat's electrical power system. And some of the most popular propellants used on satellites are highly corrosive. For these reasons, and because of the difficulties involved with miniaturization of propulsion system components, a vast majoring of CubeSats to date have been launched without any means of propulsion.

Electric propulsion systems, on the other hand, avoid many of these pitfalls. Several types of electric propulsion systems exist. Some, such as vacuum arc thrusters, use non-toxic solid propellant. These systems do not require pressure feeds or valves. In addition, electric propulsion provides very high specific impulse, on the order of thousands of seconds. This reduces the mass of fuel required; a very important characteristic when mass is limited as is the case for CubeSats.

Electric propulsion has its own challenges, however. Although these systems have very high specific impulse, they also have very low thrust and require higher power than a chemical propulsion system. Nevertheless, for satellites with as little mass as a CubeSat low thrust isn't necessarily a problem. But due to the size and mass constraints CubeSat electrical power systems are generally limited to a few watts. This can create significant challenges when designing an electric propulsion system, and will likely limit the types of systems available.

As has been discussed, CubeSats face a number of design challenges, in particular with regards to the inclusion of a propulsion system. As will be discussed in the next section, a CubeSat's inability to maneuver restricts the altitudes at which it can operate, and therefore limits the types of missions it can perform.

1.2 Orbital Debris Mitigation Standards

Early in the space age satellite controllers operated under the big sky theory (borrowed from the aviation world), which states that two objects moving in space are extremely unlikely to collide. Then in 1978 Don Kessler, a scientist at NASA's Johnson Space Center, first warned that if the amount of orbital debris continued to rise at the rate it was, someday a cascading effect of random collisions between on-orbit objects would result in an exponential growth in the collision rate and the debris population (Kessler & Cour-Palais, Collision Frequency of Artificial Satellites, 1978). During the late 1980s and early 1990s, as the creation of orbital debris became an increasing concern, the major space agencies began to take debris generation into consideration when developing their spacecraft and mission designs.

In 1995 NASA became the first agency to develop a formal set of debris mitigation guidelines. In 2002 the Inter-Agency Space Debris Coordinating Committee (IADC), an international organization with representation from twelve space agencies, adopted the first set of international guidelines, based on those developed by NASA, and in 2008 a similar set of debris mitigation guidelines was endorsed by the United Nations. All three sets of mitigation guidelines emphasize four specific areas: 1) minimizing the release of debris during on-orbit operations, 2) minimizing the possibility of accidental explosions or break-ups, 3) minimizing the risk of on-orbit collisions, and 4) removing rocket bodies and spacecraft from LEO and GEO regions of space within 25 years of completing their mission (U.S. Government, 2001) (IADC, 2007) (United Nations COPUOS, 2010). The U.N. guidelines also include language discouraging the intentional destruction of on-orbit spacecraft. This is likely because these standards were adopted after an incident in 2007 in which the Chinese destroyed one of their own satellites while conducting an anti-satellite missile test. This incident resulted in the creation of over 3,000 trackable debris objects in Low Earth Orbit (An Update of the FY-1C, Iridium 33, and Cosmos 2251 Fragments, 2013).

None of these debris mitigation guidelines are codified in treaties, nor do they carry the weight of international law, but they have been effective in reducing the amount of debris generated. Efforts to passivate satellites and upper stages by removing stored energy, have addressed what was the primary source of debris prior to 2007—on-orbit explosions. This is done by shorting out batteries, burning off remaining propellant and releasing remaining compressed gases at the end of their missions. In addition, new techniques have been used to minimize the release of clasps, lens covers and other mission-related debris. An examination of rate of debris increase shows that these efforts arrested the growth in the fragmentation and the mission-related debris populations between 1997 and 2007. The growth in the cataloged debris population as a whole came primarily from continued launch activity, which placed new payloads and rocket-bodies into orbit. Efforts to remove these objects at the end of their mission life have been less successful.

As discussed above, current standard debris mitigation practices dictate spacecraft be moved to a disposal orbit at the end of their operational life. For satellites in low Earth orbit (LEO) this generally requires lowering the spacecraft to an altitude that will allow for atmospheric reentry within 25 years. As shown in FIG. 1, for CubeSats this altitude is approximately 618 km. This altitude will vary depending on solar magnetic activity, and in particular when during the Sun's 11-year solar cycle the satellite is launched. Solar magnetic activity has a significant effect on atmospheric density, and therefore orbital lifetime for satellites in LEO. During peaks in the 11-year cycle, when solar activity is at its maximum, atmospheric density, and therefore atmospheric drag increase, reducing orbital lifetime. Any higher than that and the CubeSat will remain in orbit for more than 25 years.

At present this means that satellites at higher LEO orbits must be designed and built with a propulsion system, and they must retain sufficient propellant to perform an end-of-life maneuver. This poses a problem for CubeSats, which, as discussed in the previous section, do not typically have propulsion systems. That would involve the use of combustible, and possibly highly corrosive propellant with high pressure tanks. Such systems would create significant risk for the primary payload, and are therefore prohibited. Without a means of propulsion, CubeSats are left in their original orbit at the completion of their mission. Therefore, CubeSats are generally restricted to operational orbits no higher than 600 km. Unfortunately, of the 160 CubeSats launched between 2003 and 2013, one-third of them were placed into orbits too high to allow them to deorbit within the 25-year guideline (Selding, 2015).

SUMMARY OF THE INVENTION

A CubeSat satellite has a solar cell and an arc propulsion system. The arc propulsion system includes a power source, a first lead coupled to the power source and to a cathode, and a second lead coupled to the power source and to an anode. The solar cell is used as the cathode of the propulsion system.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 5($b$) is a chrystal structure of a p-type doped silicon, where introduction of boron atom creates an electron hole;

FIG. 5($c$) is a chrystal structure of an n-type doped silicon, showing that introduction of phosphorous atom introduces an extra electron;

FIG. 7($b$) is an arc source configuration having a second lead;

FIG. 7($c$) is an arc source configuration having a magnetic field;

DETAILED DESCRIPTION OF THE PREFERRED EMBODIMENTS

Figure 1:
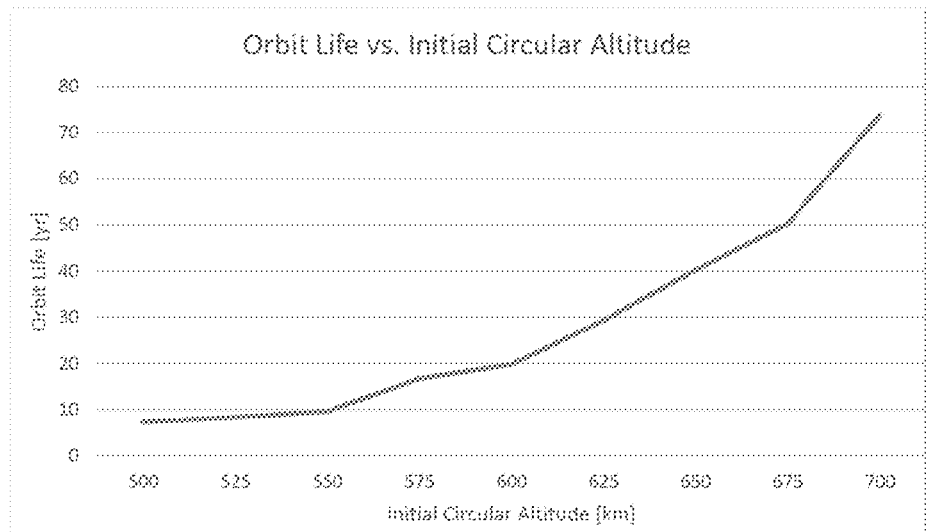
FIG. 1 is a graph of the Orbit Life vs. Initial Circular Altitude, for a 1U (10 cm×10 cm×10 cm, 1.33 km) CubeSat generated using NASA's Debris Assessment Software, showing that Orbit lifetime increases dramatically with altitude.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

2 Conceptual Model

2.1 Self-Consuming Satellite

The present invention provides a solution to the problems presented above. A CubeSat of the present invention utilizes an electric propulsion system such as a vacuum arc thruster. This system could provide the maneuverability necessary to lower the CubeSat's altitude at the end of its operational life in order to ensure it meets current debris mitigation standards. However, for a 0.001 m³, 1.33 kg satellite, mass and volume are at a premium. Adding a propulsion system, including propellant, reduces the mass and volume available to the payload and other subsystems. Mass savings could be realized if, instead of using a dedicated propellant for the end-of-life maneuver, the satellite used its own structure as propellant. In this way propellant need not be stored on board the satellite throughout its mission, waiting to be used at the end of its orbital life. After the completion of the satellite mission the structure could be consumed to provide the necessary thrust to lower the satellite orbit in order to meet debris mitigation guidelines.

For a continuous low thrust change in altitude from one circular orbit to another, the total change in velocity, or Delta-V, is equal to the difference in the circular velocities of the two orbits (Wertz & Larson, 1999, p. 149).

$$\Delta V = \|V_2 - V_1\| \qquad \text{Equation 1}$$

Where $\Delta V$ is the total change in velocity, and $V_2$ and $V_1$ are the new and original circular velocity respectively. The circular velocity of an orbit can be calculated using Equation 2.

$$V_{circ} = \sqrt{\mu/\alpha} \qquad \text{Equation 2}$$

Where $V_{circ}$ is the circular orbital velocity in km/s, $\mu$ is the Earth's gravitational parameter, equal to $3.986 \times 105$ km³/s², and $\alpha$ is the radius of the orbit in km from the center of the Earth.

Figure 2:
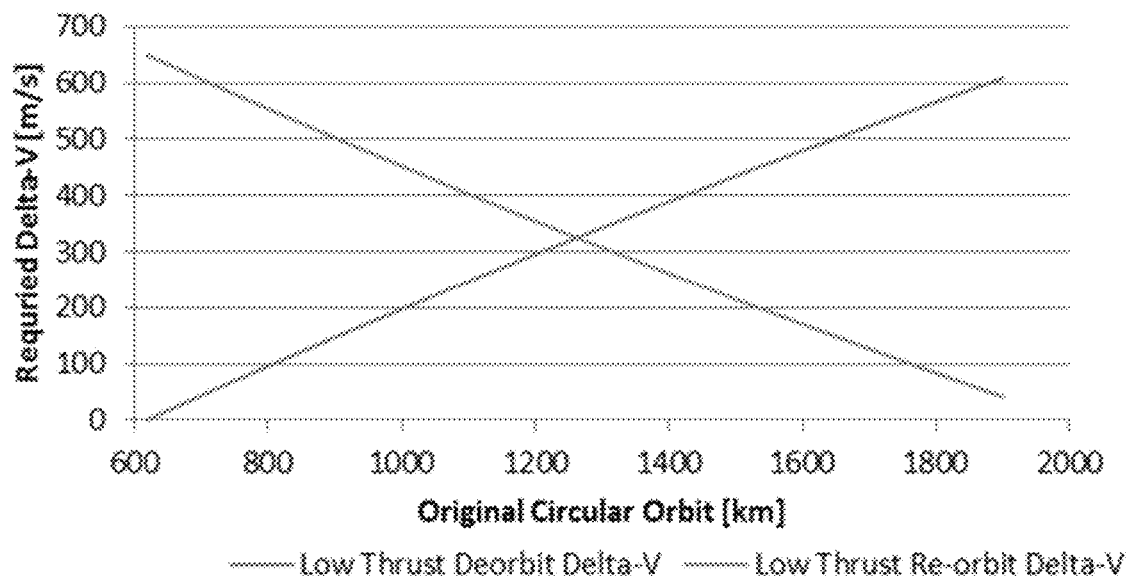
FIG. 2 is a graph of Delta-V required to achieve a 618 km or 2000 km circular orbit, using continuous low thrust maneuver, showing that either maneuver will allow a 1U CubeSat to meet international debris mitigation guidelines.

FIG. 2 shows the total Delta-V required to lower a CubeSat's altitude to 618 km, the altitude needed to deorbit the satellite within 25 years, using a continuous low thrust maneuver. The figure also shows the Delta-V required to raise the orbit of the CubeSat to 2000 km, an alternative that might be viable for higher LEO orbits that also meets existing debris mitigation standards. The required propellant to achieve a given Delta-V can be calculated using Equation 3.

$$m_p = m_0\{1 - e^{[-\Delta V/(I_{sp} \times g_0)]}\} \qquad \text{Equation 3}$$

Where $m_p$ is the mass of the required propellant, $m_0$ is the initial mass of the satellite prior to the propulsive burn, $I_{sp}$ is the specific impulse of the propellant, and $g_0$ is the acceleration due to gravity at sea level, equal to 9.81 m/s² (Wertz & Larson, 1999, p. 690). The product of the $I_{sp}$ and $g_0$ is the effective exhaust velocity of the thruster.

Figure 3:
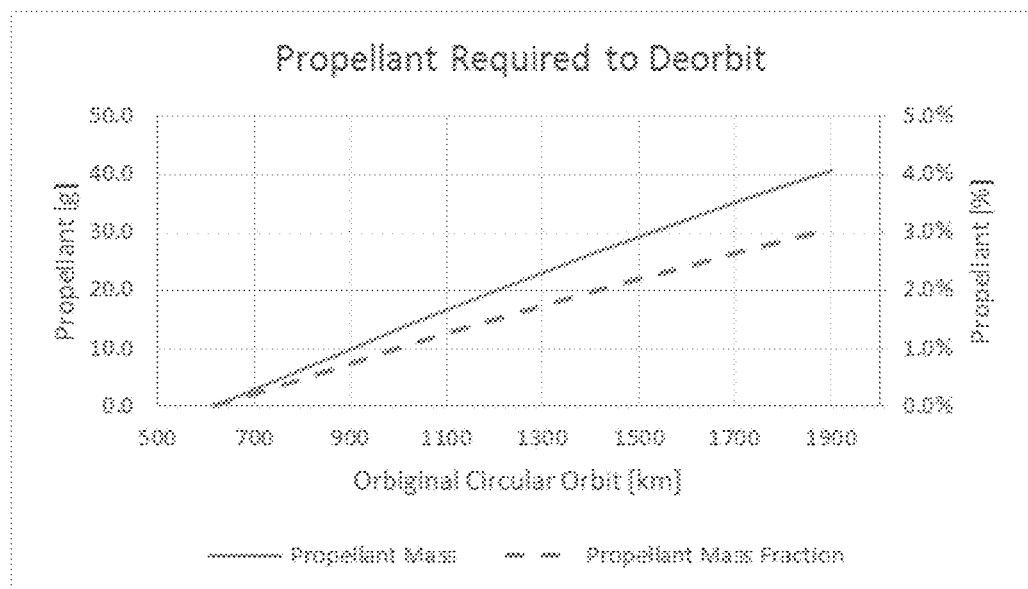
FIG. 3 is a graph of Propellant required to lower the altitude of a 1U CubeSat to comply with debris mitigation standards, assuming a 2000 s Isp.

FIG. 3 shows the propellant amount required to lower the altitude of a 1U CubeSat from a given initial circular orbit using a high $I_{sp}$ electric propulsion system ($I_{sp}$=2000 s) and a continuous low thrust maneuver. Both the mass and mass fraction (mass of propellant divided by the initial mass of the satellite) are shown.

Figure 4:
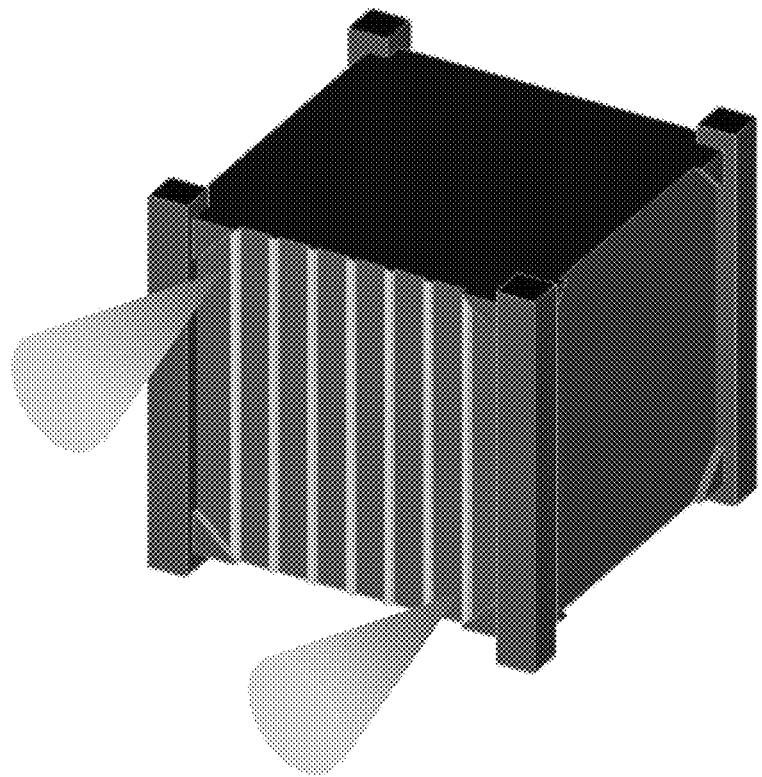
FIG. 4 is a perspective view of a self-consuming satellite Solar cells are used as the cathode in a vacuum arc propulsion system.

Vacuum arc thrusters are shown, for example, in FIG. 4. The thrusters use a solid metallic cathode for their propellant. Therefore, the structural material of the satellite theoretically provides a ready source of propellant. The exteriors of CubeSats are generally composed of body-fixed solar arrays, typically composed of silicon (Si) or gallium arsenide (GaAs). If a CubeSat could be built with a vacuum arc propulsion system that uses the Si or GaAs solar cells as the propellant, the satellite could operate at higher than normal altitudes and still meet debris mitigation guidelines by performing an end-of-life maneuver.

Ideally the cells within the solar array could be packed in such a way that the substrate material could be used as the anode in the vacuum arc. Alternatively, anode material could be distributed throughout the array. "Thruster" firings would need to be executed in pairs, as shown in FIG. 4 to prevent the introduction of a rotation moment. A drawback of this approach is that the satellite is consuming the power source needed to generate the arc. Follow on research is necessary to determine whether sufficient impulse can be generated by this system before power falls below a minimum level.

One difficulty with this proposed method is that the materials used in solar cells pose unique challenges for generating a vacuum arc. In particular, because they are semiconductors, the cathode spots generally have very low mobility. This could cause problems with non-uniform erosion of the cathode. Two methods for controlling cathode spot motion are 1) the introduction of a magnetic field and 2) relocating the negative lead on the cathode. Embodiments were successfully conducted using both of these techniques. It was found that the location of the cathode spots on a silicon cathode could be moved using either technique. Mass consumption was also increased, possibly indicating greater thrust.

2.2 Vacuum Arcs

"An arc or electric discharge is the passage of an electrical current through a medium or device which is normally insulating" (Boxman, Martin, & Sanders, 1995, p. 3). A vacuum is, in a sense, a perfect insulator. In a vacuum there is no medium through which to conduct a current. To generate an arc within a vacuum material of some type needs to be added to carry the current. For a vacuum arc, this material is provided by vaporization and electron emissions. Vaporization is the release of atoms or molecules from the surface of an object due to surface heating. In a vacuum arc the negative electrode, or cathode, is heated due to the high voltage in the system. This heating is normally concentrated at microscopic regions called cathode spots. Localized heating is thought to be the result of high current density due to microscopic protrusions on the cathode surface that enhance the electric field. In addition to vaporization, the high surface temperature also results in electron emissions; so called thermionic electron emissions. Electrons are also released from the surface of the cathode due to field emissions, which take place because of the high electric field in the vicinity of the cathode spot. Electrons from both thermionic and field emissions collide with atoms in the vapor, ionizing the atoms. The resulting electrons carry the current to the anode creating the arc. Ions colliding with the negatively charged cathode cause secondary electron emissions and help sustain the process.

When a negative charge is applied to the cathode, the surface temperature increases due to Joule heating. This heating results in the release of neutrals from the surface, known as vaporization. Using Langmuir's equation (Equation 4) shows, the flux of evaporated atoms or molecules ($\mu$) is proportional to the square root of the surface temperature (T) (Keidar & Bellis, Plasma Engineering: Applications from Aerospace to Bio and Nanotechnology, 2013, p. 66). Here n is density of vapor molecules and m is their individual mass, while k is the Boltzmann constant, equal to $1.381 \times 10^{-23}$ J/K.

$$\mu = \frac{1}{4}n\sqrt{\frac{8kT}{\pi m}} \quad \text{Equation 4}$$

Heating also leads to the thermionic emission; the release of electrons from the cathode surface due to heating. In metals the outer valance electrons are not bound to individual atoms and are free to conduct current. The amount of thermal energy needed to release an electron from the surface is called the work function ($W_f$). Typical values are in the range of 4 eV (Keidar & Bellis, Plasma Engineering: Applications from Aerospace to Bio and Nanotechnology, 2013, p. 415). The required work function can be reduced in the presence of an external electric field (E) as shown in Equation 5, where $\epsilon_0$ is the permittivity of free space, equal to $8.854 \times 10^{-12}$ F/m.

$$\Delta W = \sqrt{\frac{e^3 E}{4\pi\epsilon_0}} \quad \text{Equation 5}$$

Using this, the current density due to thermionic electron emission can be calculated as:

$$j = DAT^2 \exp\left(-\frac{W_f - \Delta W}{kT}\right) \quad \text{Equation 6}$$

where $A = 4\pi e m_e k^2/h^3$ and D is the electron reflectance coefficient, which generally depends on the material used (Keidar & Bellis, Plasma Engineering: Applications from Aerospace to Bio and Nanotechnology, 2013). -e and $m_e$ in the previous equation are the elementary charge and mass of a single electron, equal to $1.602 \times 10^{-19}$ C and $9.19 \times 10^{-31}$ kg respectively, while h is Plank's constant, $6.626 \times 10^{34}$ J s.

Electron emission occurs not only because of increased cathode surface temperature, but also due to the electric field near the cathode. The current from these emissions is given by:

$$j = C_1 E^2 \exp\left(-\frac{C_2}{E}\right) \quad \text{Equation 7}$$

where $$C_1 = \frac{e^3 W_0^{0.5}}{2\pi h(W_f + W_0)W_f^{0.5}}$$

and $$C_2 = \frac{8\pi(2m_e)^{0.5} W_f^{1.5}}{3eh}$$

$W_0$ is the Fermi level of the material. The Fermi level represents the highest electron energy state of a material at absolute zero. It can be calculated using Equation 8.

$$W_0 = \frac{h^2}{2m_e}(3n_e/8\pi)^{2/3} \quad \text{Equation 8}$$

where $n_e$ is the electron density. It is through the release of electrons, both thermionic and field emissions, that current is conducted in a vacuum arc.

Atoms that are introduced into the vacuum through vaporization will collide in the region near the cathode wall with electrons introduced through thermionic and field emissions. Collisions between atoms and electrons will ionize the atoms. Atom-ion paired collisions will result in a positively charged ion and two electrons if there is enough energy to free an electron from the atom's valence shell. Coulomb forces will draw the electrons to the anode, carrying the current with them.

2.3 Cathode Spots

The cathode spots from a vacuum arc are generally grouped into one of two types. Type 1 cathode spots are associated with contaminated or oxidized surfaces. Whereas type 2 cathode spots are seen on clean surfaces. Type 1 cathode spots are characterized by smaller craters that are separated from one another, faster spot motion, and lower erosion rates. Embodiments using stainless steel have shown type 1 cathodes spots to be on the order of 0.2 to 2.0 µm, while the majority of the type 2 cathode spots were approximately 20 µm in diameter; one to two orders of magnitude larger (Boxman, Martin, & Sanders, 1995, p. 80). Cathode spot velocities for type 1 spots are in the range of 10 to 1000 m/s, where type 2 spots are slower, generally between 1 and 100 m/s (Boxman, Martin, & Sanders, 1995, p. 86). The displacement of the cathode spots is generally chaotic, resulting in a random motion. However, in the presence of a transverse magnetic field the motion becomes more directional, and the spot velocity increases with an increasing magnetic field strength, up to a limit generally around 1.0 T (Boxman, Martin, & Sanders, 1995, pp. 93-94) (Fang, 1982, p. 833). This motion is in a retrograde direction (−J×B), that is, opposite of what would be expected using Ampere's Law (Boxman, Martin, & Sanders, 1995, p. 87). To date a suitable theory explaining this motion has not been proposed (Beilis, 2002, p. 2124) (Fang, 1982, p. 834).

The erosion rate of type 1 spots is also lower than type 2 cathode spots. The lower erosion rate associated with type 1 cathode spots results from the release of surface gases instead of metal (Boxman, Martin, & Sanders, 1995, p. 81). Typical erosion rates for type 2 cathode spots for metals such as Cu, Mo, W or Ti range from 30 to 60 µg/C (Keidar & Bellis, Plasma Engineering: Applications from Aerospace to Bio and Nanotechnology, 2013, p. 417). Spots can transition from type 1 to type 2. As the oxidation is eroded from the cathode surface by the arc, the spots begin to release material from the now clean metal surface, resulting in larger, slower moving cathode spots, and an increased erosion rate (Fang, 1982, p. 836).

2.4 Solar Cells

Solar, or photovoltaic (PV), cells generate DC power by converting light into an electrical current. This is accomplished by establishing an electric field within the PV cell and using that field to generate current. This is accomplished without the use of any moving parts.

PV cells are typically manufactured using semiconductor materials such as silicon. Semiconductors do not have free moving valance electrons to conduct electricity as metals do. In metals the conduction energy band, where free moving electrons reside, overlaps with the valance band, the highest unexcited electron energy band. In semiconductors there is a gap between these two bands. There are no energy levels for the electrons to occupy in this gap, so they must have their energy increased to overcome the band gap in order to conduct a current. Therefore, they are poor conductors of electricity, especially at low temperatures (Goetzberger, Knobloch, & Voss, 1998, p. 10).

Figure 5A:
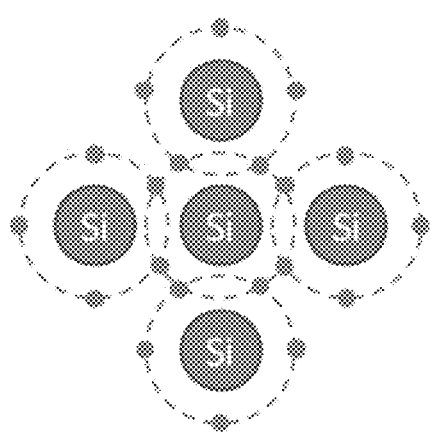
FIG. 5($a$) is a chrystal structure of an un-doped silicon, where the Silicon atoms share four valance electrons to fill outer shell forming crystal structure.
Figure 5B:
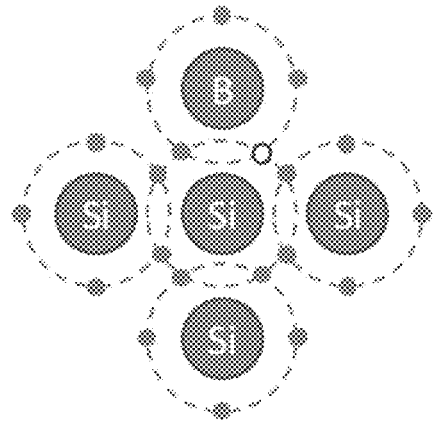
Figure 5C:
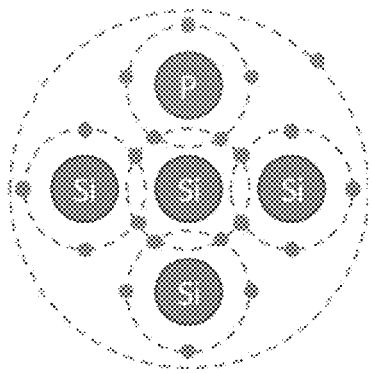

Chemically, a silicon atom has a half filled valance shell with four electrons occupying the outermost shell. As a result, silicon atoms form into a crystal structure, sharing their outer electrons with four other silicon atoms in an attempt to fill this outer shell. By sharing four electrons with four other silicon atoms, each atom essentially has a full valance shell with eight electrons, as shown in FIG. 5(a). By adding small amounts of elements such as phosphorus, which has five valance electrons, to the crystal structure one extra unshared electron is introduced into the structure for each phosphorous atom as shown in FIG. 5(c). This is known as n-type doped silicon. Similarly, if an impurity with three valance electrons, such a boron, is added to pure silicon this results in a deficiency of electrons, or electron holes as seen in FIG. 5(b). This is p-type silicon. Separately p-type and n-type silicon are electrically neutral; each sample contains an equal number of electrons and protons. The "extra" electrons in the n-type silicon simply means there are more electrons than are necessary for the crystal structure. Likewise, the holes in p-type silicon means more electrons are desired to maintain the structure (Wurfel, 2005, p. 47).

Figure 6:
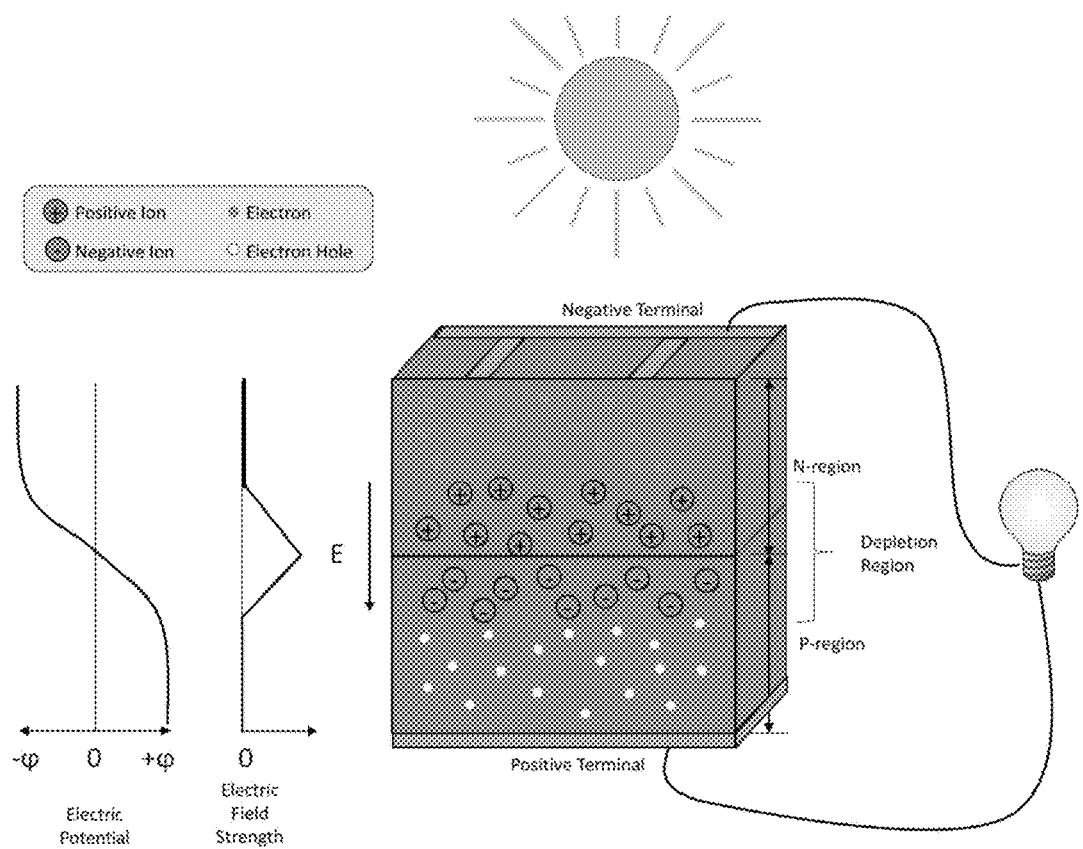
FIG. 6 is a diagram showing the structure of a photovoltaic (solar) cell, where a space charge develops within the depletion region due to diffusion of electrons across the junction, creating a potential difference and resulting electric field, which creates a DC current when electrons within the depletion region are excited by photons from the sun.

However, when p-type and n-type silicon are brought into contact forming a p-n junction, the extra electrons from the n-type diffuse over to the p-type silicon, filling the electron holes (Wurfel, 2005, p. 95). This migration of electrons results in the buildup of an electric charge in each sample near the junction between them; positive within the n-type where positive ions are created when the electrons depart, and negative in the p-type where negative ions are made when electrons fill the holes as shown in FIG. 6. Eventually the positive space charge that develops on n-side of the p-n junction inhibits further diffusion of electrons across the junction. The portion of the two samples near the p-n junction where there is some level of ionization is known as the depletion region.

As can be seen in FIG. 6, the difference in electric potential on each side of the junction caused by the charged ions creates an electric field within the depletion region (Goetzberger, Knobloch, & Voss, 1998, p. 50). If photons from a light source with sufficient energy are absorbed by atoms within the depletion region, some of their valance electrons become excited and move to the conduction band creating new electron-hole pairs. The Lorentz force from the electric field within the depletion region cause these electrons to move opposite to the electric field, i.e., toward the neutral region within the n-type silicon. Likewise, the electron holes will essentially flow toward the p-type silicon as they are filled by electrons from that region (Komp, 1995, p. 15). Together, the movement of electrons and electron holes creates a current within the solar cell. Contacts that have been added to the surfaces of both types of silicon connect the solar cell to a load creating a circuit. This allows the free electrons in the n-type silicon to flow to the load and back to the p-type silicon. The resulting current can be added to the current from other solar cells and used as a source of DC power to recharge batteries or power electronic systems.

Because of the nature of the depletion region, current can only flow in one direction through a PV cell, meaning the cell acts like a diode. As was already mentioned, the electric field in the depletion region impedes the flow of electrons from the n-region to the p-region. If a voltage were applied across the cell with the positive terminal on the n-region and the negative terminal on the p-region, this would create a reverse bias further impeding the flow of electrons. On the other hand, if the voltage were applied with the positive terminal on the p-region and the negative terminal on the n-region the cell would be forward biased. The applied voltage would help the electrons in the n-region overcome the electric field in the depletion region, allowing them to migrate across to the p-region and current to flow.

3 Embodiments

3.1 Setup

The invention was carried out to determine the feasibility of increasing cathode spot motion in semi-conductors. If cathode spot motion could be increased, this would be an initial first step in exploring the feasibility of using CubeSat solar cells as propellant for an end-of-life maneuver. Three embodiments are provided using flat plate arc sources. The embodiments are tested in a vacuum chamber evacuated to $5 \times 10^{-4}$ torr to simulate space conditions. All three arc sources used a silicon cathode and steel anode separated by a boron nitride insulator of approximately 1 mm and coated with carbon paint. The insulator sustains the arc and prevents a short circuit by separating the cathode and anode. The power supply represents any power supply for a micro-cathode arc thruster, such as provided in U.S. Pat. Nos. 9,517,847 and 8,875,485, the entire contents of which are hereby incorporated by reference.

Figure 7A:
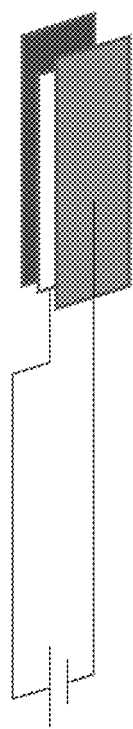
FIG. 7($a$) is an arc source configuration having a single lead.

The cathode in the first non-limiting embodiment of the invention, shown in FIG. 7(a) had a single electric lead connected to a power source. Photographs of the cathode surface were taken using a scanning electron microscope both before and after the embodiment was operated. Mass loss was measured and erosion rate calculated as discussed below.

Figure 7B:
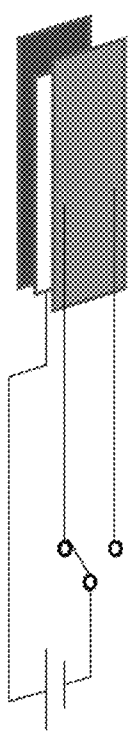

In the second non-limiting embodiment of the invention, shown in FIG. 7(b), two leads were used on the cathode, with a switch coupled between the two leads and the power source to select which of the leads receive power. In the second embodiment the arc was initiated in one lead, then switched to the other lead for the duration of the setup. Photographs, mass loss and erosion rate were again taken and calculated as in the first embodiment. Both embodiments were run for approximately 130 minutes at 38 pulses per minute. This resulted in approximately 5,000 pulses in each embodiment.

Figure 7C:
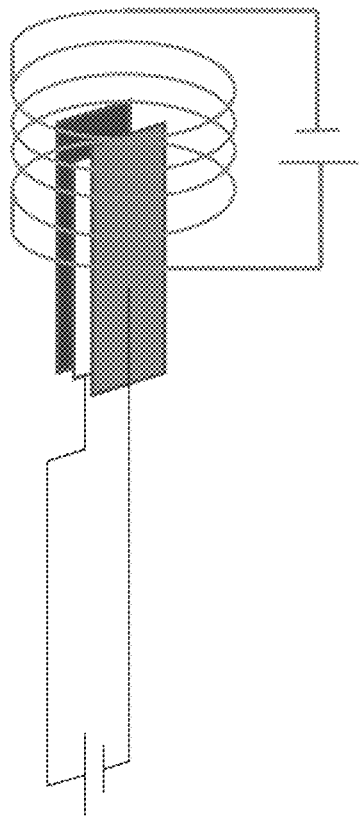
Figure 8:
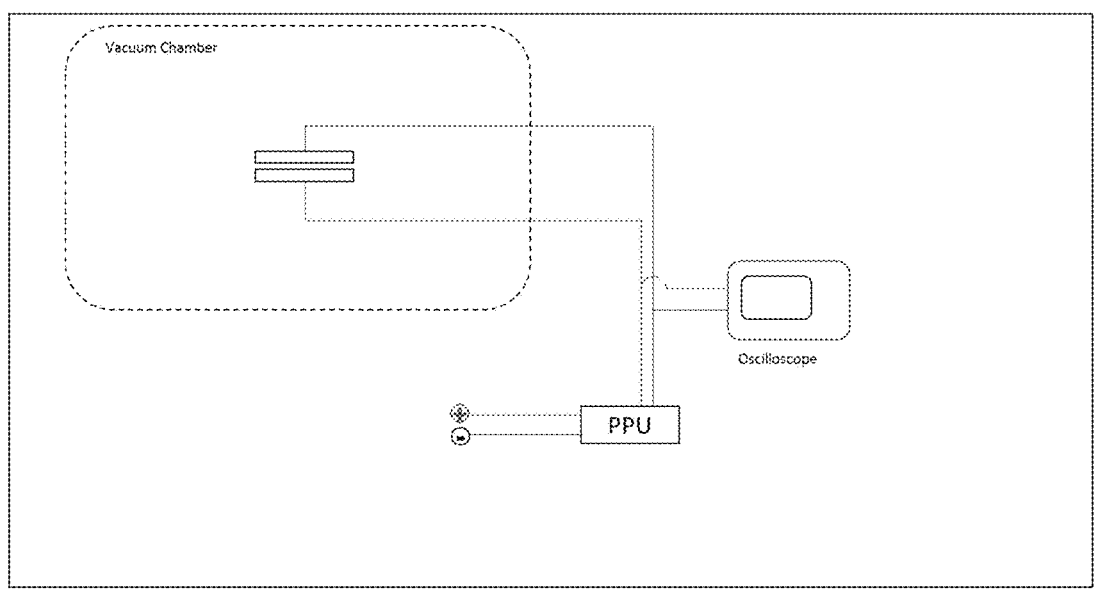
FIG. 8 is a circuit diagram of FIG. 7($a$) using a single electrical lead to the cathode and no magnetic field.
Figure 9:
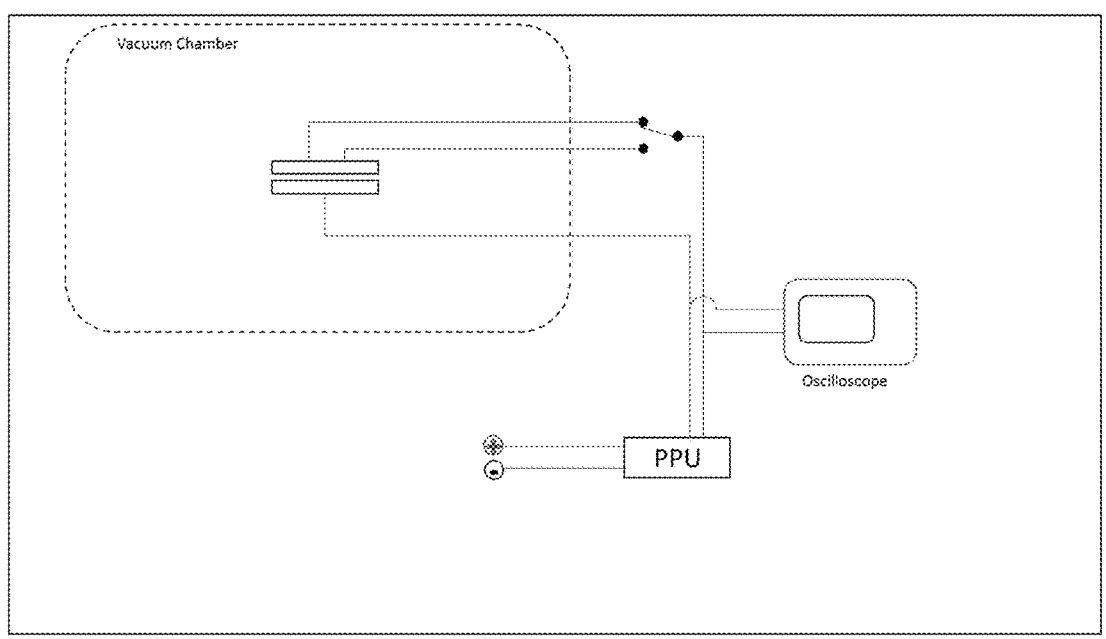
FIG. 9 is a circuit diagram of FIG. 7($b$) using two electrical leads to the cathode.
Figure 10:
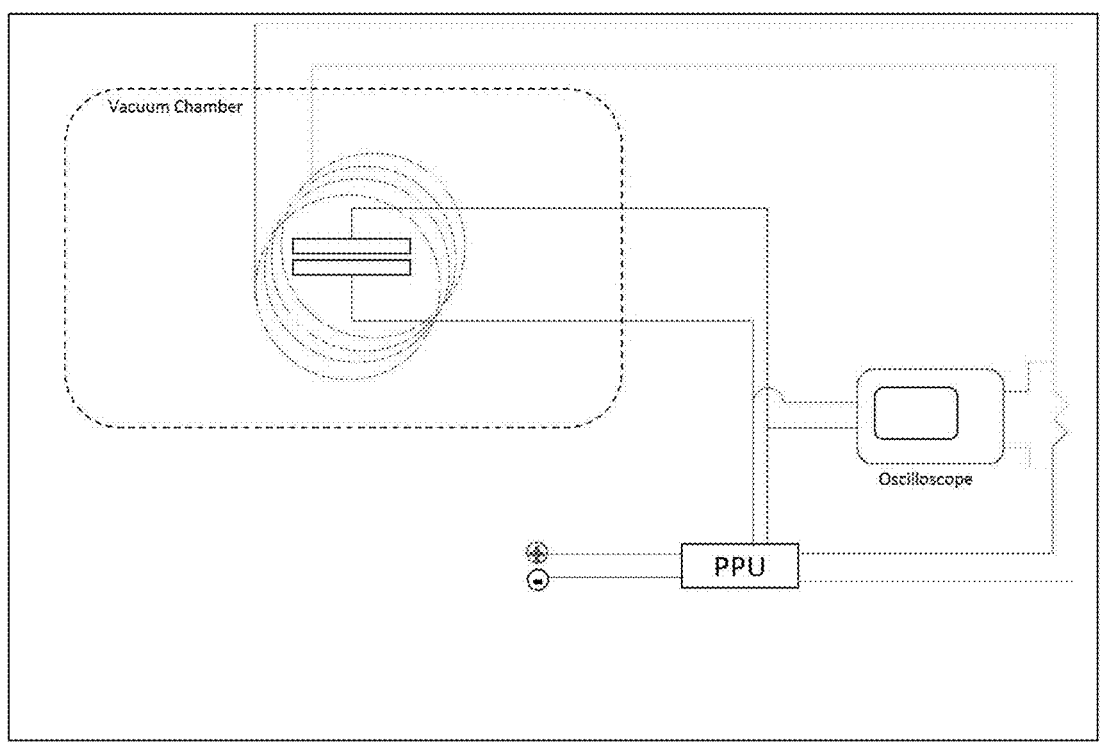
FIG. 10 is a circuit diagram of FIG. 7($c$) using a magnetic field.

For the third non-limiting embodiment of the invention, shown in FIG. 7(c), a magnetic coil is provided around the arc source with a field strength of up to 160 mT. A single lead is placed on the cathode, and the coil can at least partly or fully extend about at least a portion of or entire of the cathode and/or anode. As discussed earlier cathode spot velocity increases and becomes directional in the presence of a magnetic field. Photographs, mass loss and erosion rate were again taken and calculated. This embodiment set up was run for a shorter period of time, but at a high pulse repetition rate, resulting in approximately 4,800 pulses. Diagrams showing the setup for each of the three embodiments are shown in FIGS. 8-10.

Thus, as the voltage applied to the coil increases, the intensity of the magnetic field increases, which changes the location (the arc root or cathode spot) of the arc on the cathode. By moving the arc root, a more uniform erosion of the cathode is achieved.

In addition, a processing device such as a controller can be provided to control operation of the propulsion system. For example, the controller can determine when the satellite is at the end of its life and to de-orbit, or receive a signal from a remote location that indicates that the satellite is at the end of its life and to de-orbit. In response, the controller can activate the propulsion system to de-orbit the satellite. For the first embodiment of FIG. 7(a), the controller can provide power to the leads. For the second embodiment of FIG. 7(b), the controller can further operate the switch to selectively control one or more leads placed on the cathode over time to more fully consume the cathode. For the third embodiment of FIG. 7(c), the controller can operate the coil to turn on and off as needed.

It should further be noted that the second and third embodiments of FIGS. 7(b) and 7(c) can be combined. Accordingly, there can be multiple leads placed on the cathode, and also a coil surrounding the cathode and/or anode.

3.2 Results

Figure 11A:
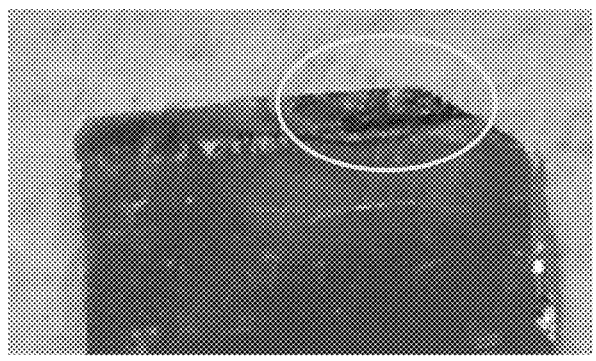
FIG. 11($a$) is a photograph of silicon cathodes for the configuration of FIG. 7($a$) showing a single isolated region of erosion.
FIG. 11(b) is a photograph of silicon cathodes for the configuration of FIG. 7(b) showing two separate spot regions.
Figure 11B:
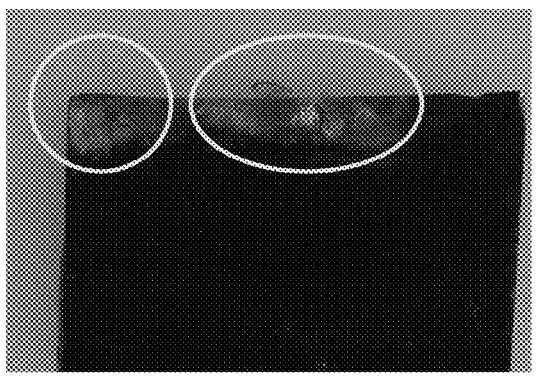

FIG. 11 shows photographs of the two silicon cathodes used after the first two embodiment set ups were run. Referring to FIG. 11(a), a single region of cathode spot erosion is evident in the cathode used in the first embodiment (FIG. 7(a)) using a single electrical lead. Referring to FIG. 11(b), two cathode spot regions can be seen in the cathode used in the second embodiment (FIG. 7(b)) where two negative leads were used. The region in the upper left corner is where the arc originated when the first lead was used, and the second, larger region in the middle of the upper edge of the cathode is where the arc appeared when the second lead was used instead. The color differences between the two cathodes is a result of lighting conditions.

Figure 12A:
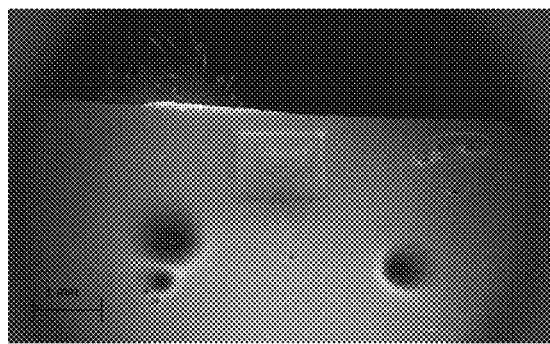
FIGS. 12(a), (b) are photographs of a silicon cathode from the single lead embodiment of FIG. 7(a) taken before (FIG. 12(a)) and after (FIG. 12(b)) the use with a scanning electron microscope, with common features are circled in red, and the cathode spot region is circled in yellow.
Figure 12B:
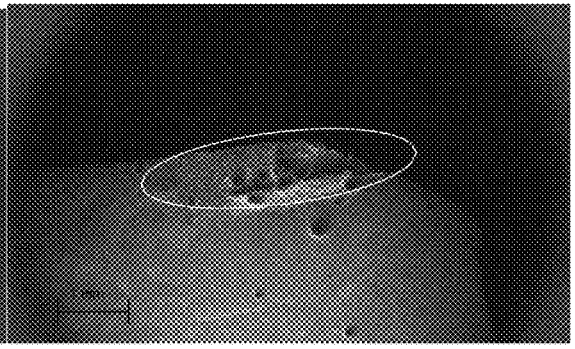

FIG. 12 shows before and after images of the cathode used in the first embodiment taken using a scanning electron microscope. Features seen in both images are circled in the smaller ovals (2 in each of FIGS. 12(a) and 12(b)), and the region of erosion is circled in a large oval in FIG. 12(b). The arc appears to have initially been generated at the location of some impurities in the material.

Figure 13A:
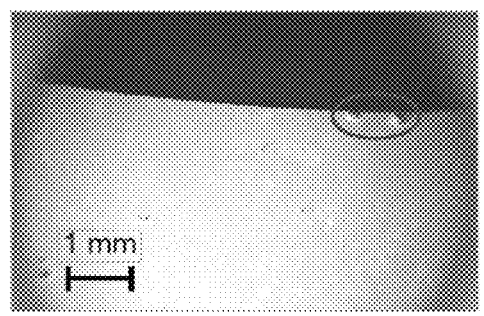
FIGS. 13(a), (b) are photograph of silicon cathode from the dual lead embodiment, with images of the dual lead silicon cathode from the second embodiment taken before (FIG. 13(a)) and after (FIG. 13(b)) the embodiment using a scanning electron microscope, with common features are circled in red, and the cathode spot regions are circled in yellow.
Figure 13B:
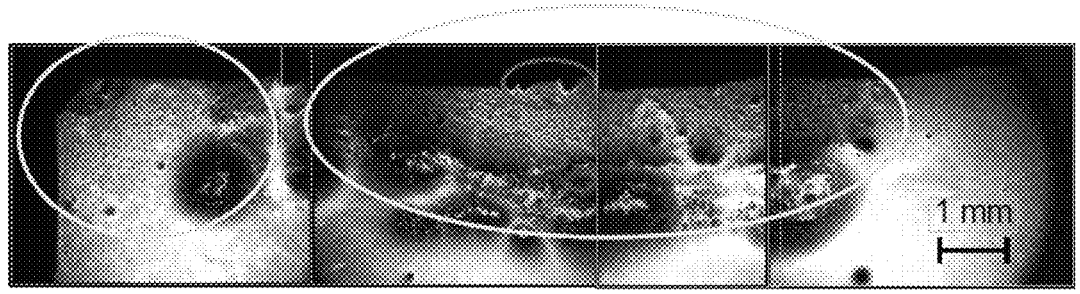

FIG. 13 shows before and after images of the cathode used in the second embodiment taken using a scanning electron microscope. Features seen in both images are again circled (one small oval in each of FIGS. 13(a) and 13(b)), and the regions of erosion are circled (two large ovals in FIG. 13(b)). As stated previously, the region in the upper left corner is where the arc originated when the first lead was used, and the second, larger region in the middle of the upper edge of the cathode is where the arc appeared when the second lead was used instead. Significant melting is evident at the edges of this region.

Figures 14A, 14B:
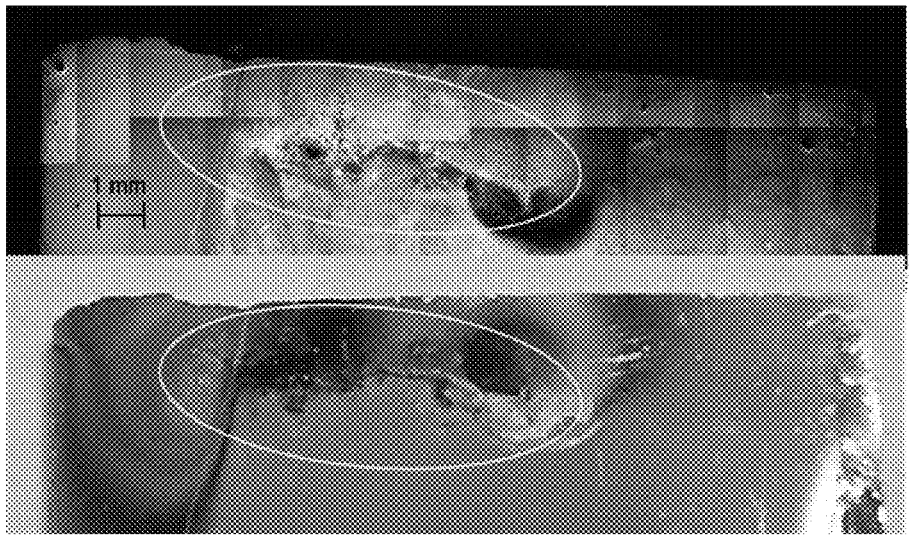
FIG. 14(a) is a silicon cathode from magnetic coil experiment, with images of the magnetic coil experiment taken after the experiment with a scanning electron microscope and with a camera.
FIG. 14(b) shows the large cathode spot region in the middle of the cathode.
Figure 15:
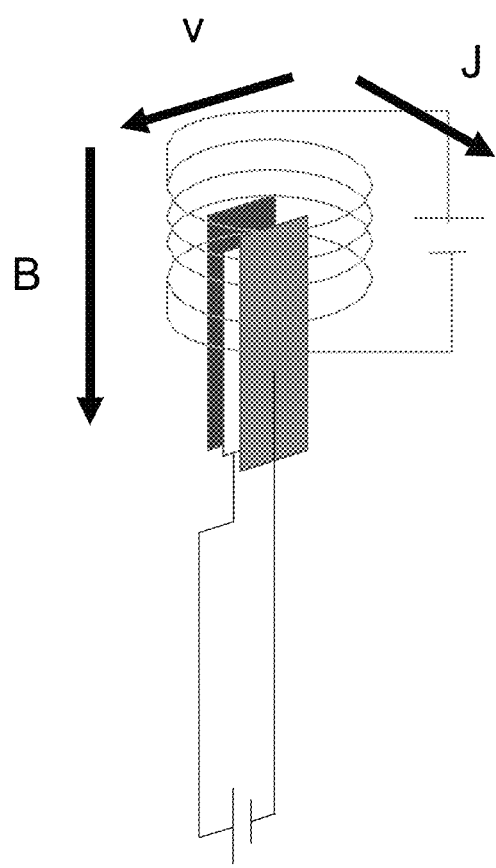
FIG. 15 is a magnetic field causing cathode spot motion in the B×J direction, where the motion is opposite to that which would be expected from Ampere's Law.

FIG. 14 shows a composite image. FIG. 14(a) combines several images taken after the third embodiment (FIG. 7(c)) using a scanning electron microscope, and FIG. 14(b) is a photograph of the same cathode. A magnetic coil was used in this embodiment to create a magnetic field of up to 160 mT in the vicinity of the arc, thereby inducing cathode spot motion in the B×J direction as shown in FIG. 15. A large cathode spot region can be seen circled in those FIGS. 14(a), (b).

Figure 16:
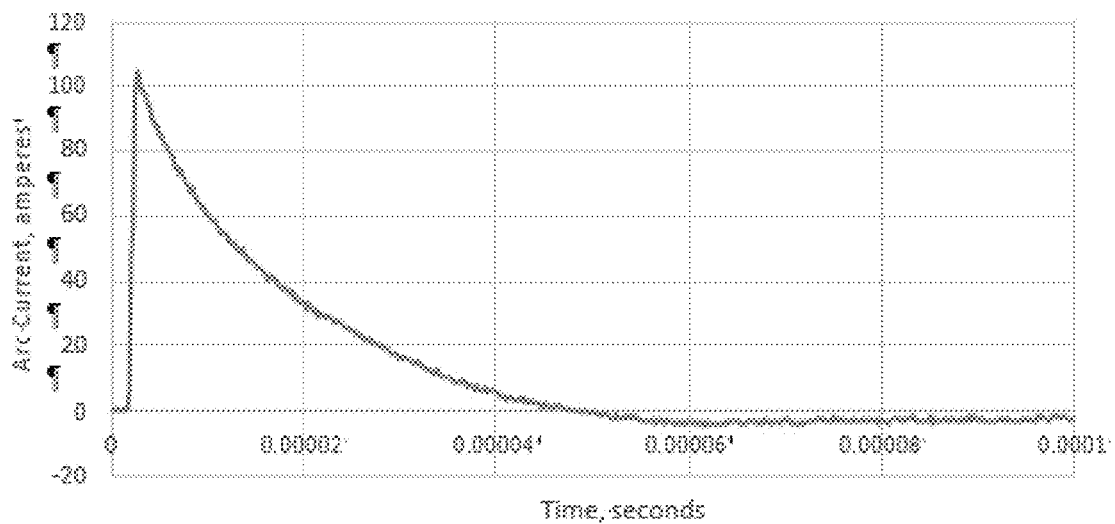
FIG. 16 shows an arc current over one pulse, where the arc current was used to calculate transported electric current and erosion rate.

The mass of the cathodes was determined before and after each embodiment was run, and mass loss calculated. The mass loss during the first embodiment using a single lead was 100 μg, and the mass loss during the second embodiment using two leads was 180 μg, an 80% increase. Arc current readings were taken during the embodiment as shown in FIG. 16, and used to calculate a transported electric charge of 1500 μC per pulse. Since there were approximately 5,000 pulses each embodiment this results in 7.5 C in each embodiment, and an erosion rate of 13.3 μg/C in the first embodiment and 24 μg/C in the second. Erosion rates depend on the cathode material used and are more typically in the 50-500 μg/C range (Boxman, Martin, & Sanders, 1995, p. 124).

Nevertheless, a significant increase in the erosion rate was seen when the cathode spot region was moved using two leads on the cathode. An even greater increase was seen when the magnetic coil was used. In that embodiment the mass loss was 830 μg, and the transported electric charge was 4,400 µC per pulse. The approximately 4,800 pulses during the embodiment therefore resulted in a total of 21.1 C and an erosion rate of 39.2 µg/C. However, the larger charge per pulse may have resulted in increased sputtering in this embodiment, meaning more mass loss could have been in the form of large neutral particles rather than the desired plasma. Table 1 is a summary of the erosion rates calculated in the three embodiments.

TABLE 1

Erosion Rates of Silicon Cathode Embodiments

| Embodiment | Transported Electric Charge | Pulses | Total Charge | Mass Loss | Erosion Rate |
|---|---|---|---|---|---|
| Single Lead | 1500 µC/pulse | 5000 | 7.5 C | 100 µg | 13.3 µg/C |
| Two Leads | 1500 µC/pulse | 5000 | 7.5 C | 180 µg | 24.0 µg/C |
| Magnetic Field | 4400 µC/pulse | 4800 | 21.1 C | 830 µg | 39.2 µg/C |

3.3 Conclusion

The cathode spots on a silicon cathode were found to be immobile, clustering around a single region on the cathode material. By using two negative leads to relocate the source of the electric current, it was found that the location of the spot region could be moved. In addition, creating a new spot region in this manner resulted in an increased erosion rate. Placing the arc source within a magnetic field also resulted in an increased erosion rate. Although no ion velocity measurements were taken, and therefore thrust could not be calculated, these results could have important implications in a propulsion system such as the one described earlier that uses a satellite's solar cells as the cathode material to generate a vacuum arc.

Assuming a 25,800 m/s ion velocity (Yushkov, Anders, Oks, & Brown, 2000) and using Equation 3, the required propellant was calculated as shown in Table 2. The transport electric charge and erosion rate from embodiment number one were then multiplied together along with a pulse rate of 50 pulses per second to arrive at a mass flow rate of $1 \times 10^{-6}$ g/s. An exhaust velocity of 25,800 m/s and mass flow rate of $1 \times 10^{-6}$ g/s yields a thrust of 26 µN. After dividing the required propellant mass by the mass flow rate, the results in the far right column of Table 2 were obtained. This is a summary of how much time would be required to reduce the altitude of a 1U CubeSat to 618 km using a Si cathode vacuum arc thruster. Reducing the CubeSat's altitude to this height would allow it to deorbit in accordance with internationally recognized debris mitigation standards.

TABLE 2

Required propellant and time to reduce the altitude of a 1 U CubeSat using a Si cathode vacuum arc thruster to allow it to deorbit within 25 years. Assuming 25,800 m/s ion velocity, 1500 µC/pulse, 13.3 µg/C erosion rate, and 50 pulses per second.

| Altitude(km) | Delta-V(m/s) | Propellant(g) | Mass Fraction(%) | Time(days) |
|---|---|---|---|---|
| 700 | 44 | 2.3 | 0.2 | 26 |
| 800 | 96 | 5.0 | 0.4 | 58 |
| 900 | 148 | 7.6 | 0.6 | 88 |
| 1000 | 198 | 10.2 | 0.8 | 118 |
| 1100 | 247 | 12.7 | 1.0 | 147 |
| 1200 | 296 | 15.2 | 1.1 | 176 |

3.4 Solar Cells

In a non-limiting example of the invention, the arc propulsion system can include one or more solar cells. The solar cells are attached to the satellite body, such as the housing and/or frame, and are at the exterior of the satellite. The solar cells are used to generate energy from the sun for use during the life of the satellite to provide power to various electronic components on the satellite such as communications components and imaging components. At the end of life of the satellite, the arc propulsion system uses the solar cells as a propellant by ablating the solar cells, thereby leading to satellite self-consumption. The solar cells extend along the exterior of the satellite, the arc discharge runs along the solar cells.

Figure 17:
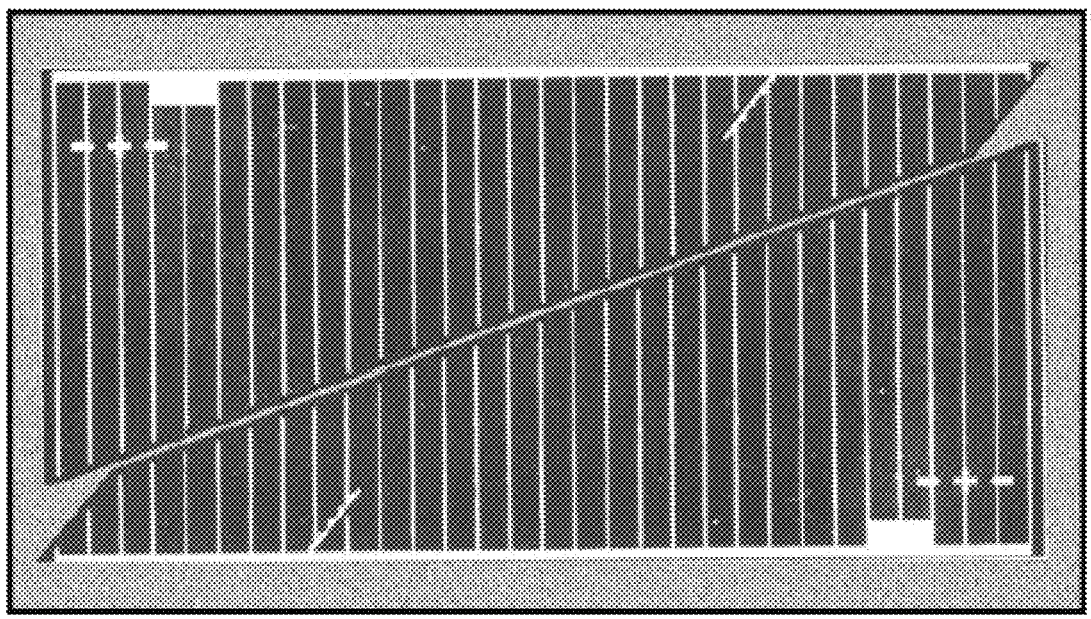
FIG. 17 shows a triangular Advanced Solar Cells, with two cells highlighting compact geometry.

The invention further includes the use of actual solar cells to create a vacuum arc. Spectrolab's Triangular Advanced Solar Cells (TASC), shown in FIG. 17, were used for these embodiments. These are triple-junction gallium arsenide cells rather than single junction silicon. Gallium arsenide (GaAs) has gradually replaced silicon in space applications because, although it is less abundant and more expensive than silicon, it is much more efficient at converting sunlight to electricity. Silicon cells have a typical efficiency of approximately 14.8%, while GaAs cells have an efficiency in the range of 18.5% (Wertz & Larson, 1999, p. 414).

Figure 18:
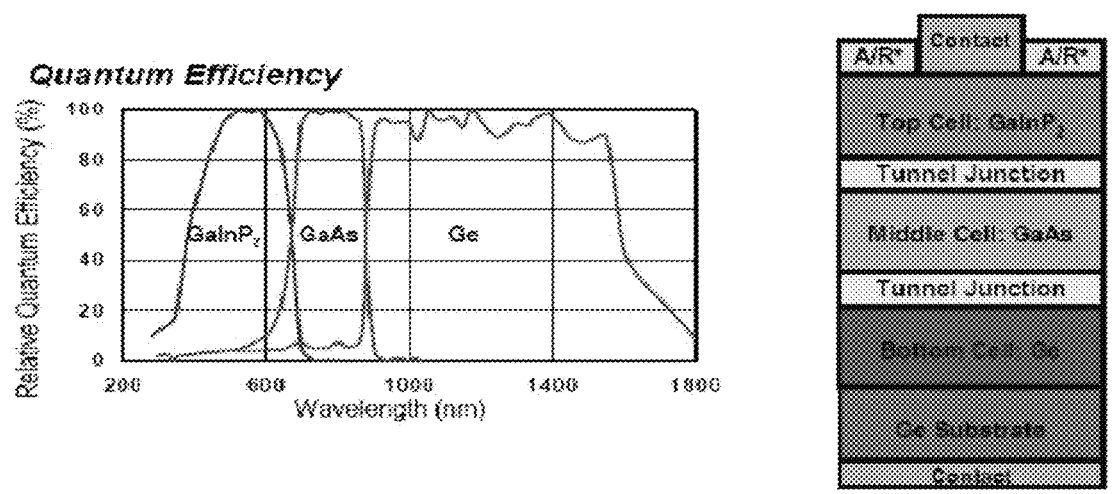
FIG. 18 shows a structure of triple junction solar cell, where short wavelengths are absorbed by the upper layers, while longer wavelength are transmitted to the lower layers.

In addition, referring to FIG. 18, using three cells of different semiconductor materials stacked in layers one on top of the other, allows the complete cell to absorb a larger wavelength of energy, with the higher wavelengths passing through to the lower cells. In the case of the TASC, the top gallium indium phosphide (GaInP2) cell absorbs light between approximately 400 and 700 nm, whereas the middle GaAs cell is most efficient at absorbing light between 700 and approximately 900 nm, and the bottom germanium cell (Ge) is most efficient beyond 900 nm. Triple junction solar cells such as this achieve efficiencies of up to 22.0% (Wertz & Larson, 1999, p. 414).

The invention identifies an efficient design for generating a self-sustaining arc, as well as the necessary current, voltage, and spacing between the solar cell surface and the anode material. Copper wiring was used for the anode, and geometries included placing the wire across the surface of the cell, normal to the cell surface, or next to the cell. Working with fragile solar cells can be challenging. Individual cells can frequently crack or even break when handled. A small bulb-suction tool was purchased early on and used for ease of handling.

Initially a 30 V DC continuous power source was used, with currents from 5 to 30 Amps. These initial trials were conducted in atmosphere. Achieving breakdown proved difficult at currents that didn't cause significant damage to the solar cell. Eventually a pulsed power source similar to the one used in the silicon vacuum arc embodiments was employed. This proved to be the key to achieve a reliable repeatable arc on the cell. With this power source sufficient current was available at a high enough current to achieve breakdown, but for a short enough period of time (approximately 100 µs) to avoid damage to the solar cell.

Figure 19:
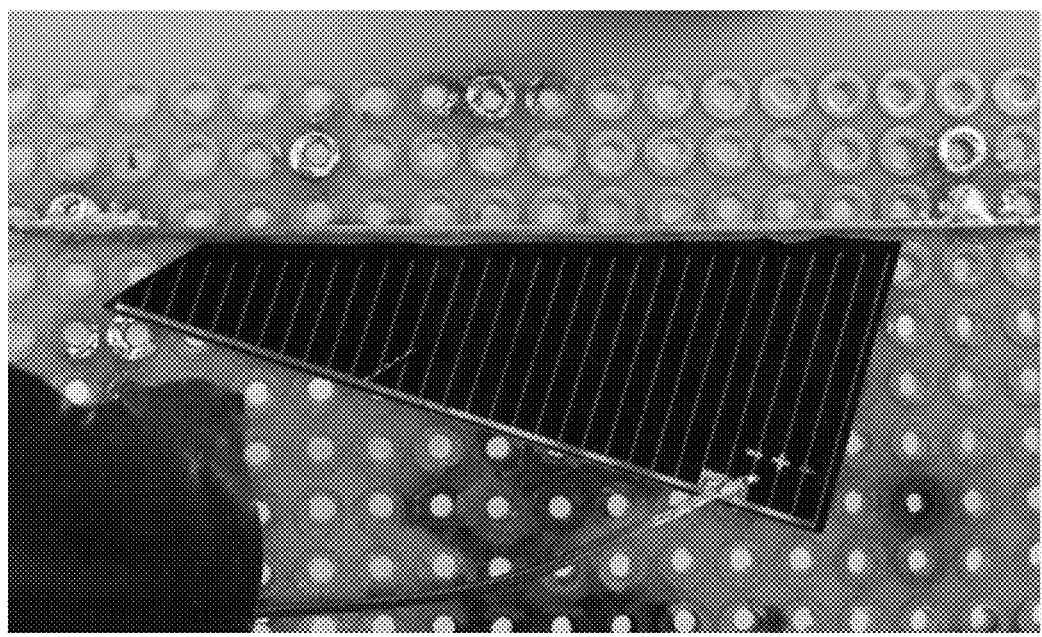
FIG. 19 is an embodiment for solar cell, where the negative lead is soldered to the upper contact of cell, and the copper wire anode is along the edge of the cell.

The final geometry for the setup is shown in FIG. 19, with the negative lead from the power supply attached to the negative lead on the top of the cell, and the positive lead running parallel to the edge of the cell at approximately half a millimeter distance. Distance between the bare copper wire and the edge of the cell varied due to the rough edge of the cell.

Attaching the negative lead to the solar cell meant the cell would act as the cathode during the arc rather than the cathode. Attaching the lead to the top of the cell (the n-region) rather than to the back of the cell was necessary because of the diode-like characteristics of the cell discussed in section 2.2.4. Current will only flow through the solar cell with the voltage applied in a forward bias direction that is with the negative lead attached to the top of the cell.

Figure 20:
FIG. 20 shows a solar cell during breakdown, where the cell glowed red during arcing.
Figure 21:
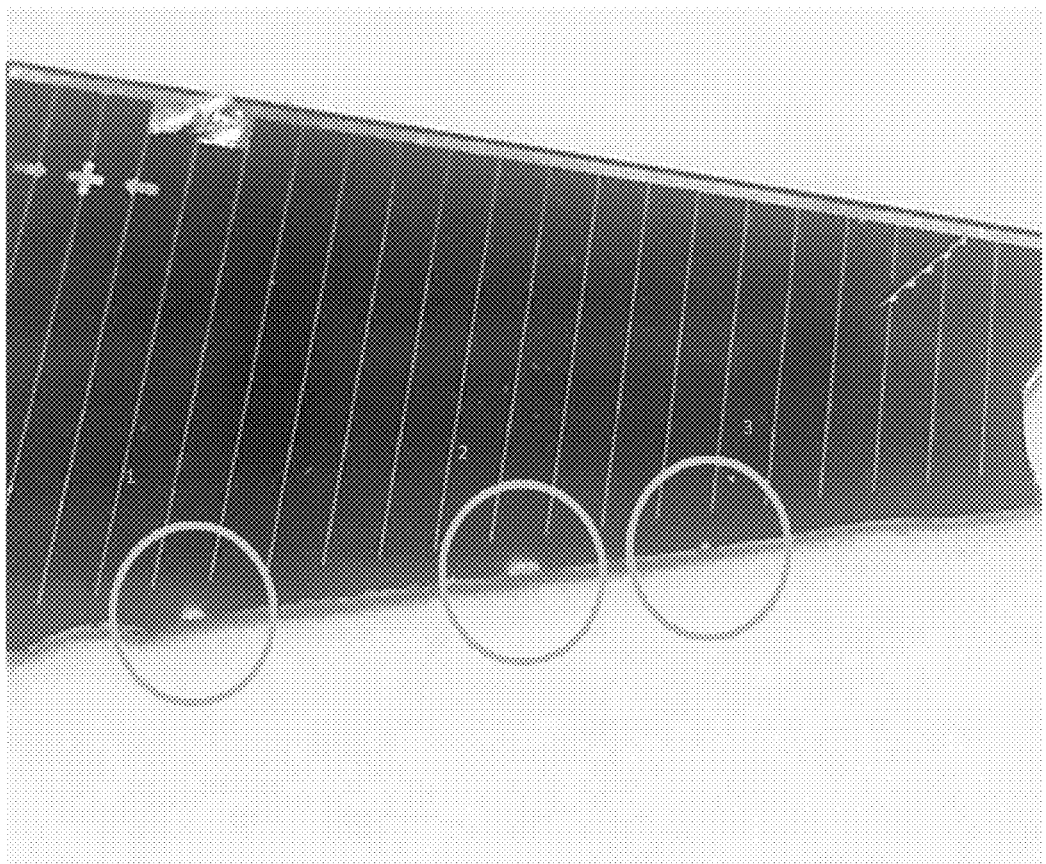
FIG. 21 shows results from solar cell experiment, where three cathode spot regions are visible.
Figure 22:
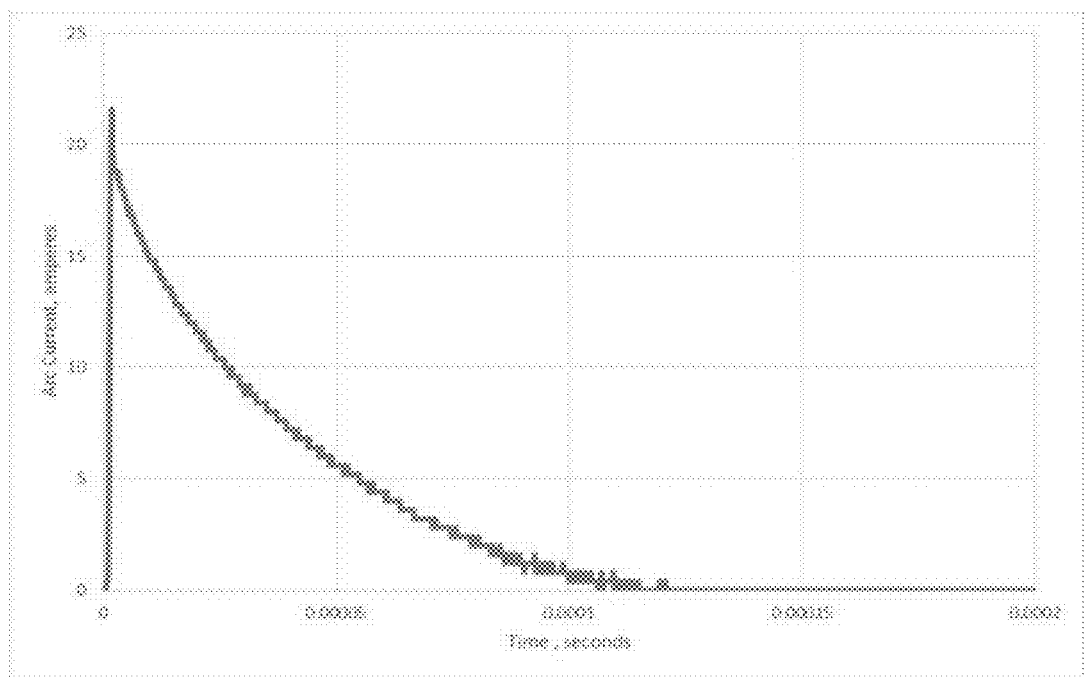
FIG. 22 shows arc current as a function of time Peak arc current of 20 A with a pulse length of 100 μs.
Figure 23A:
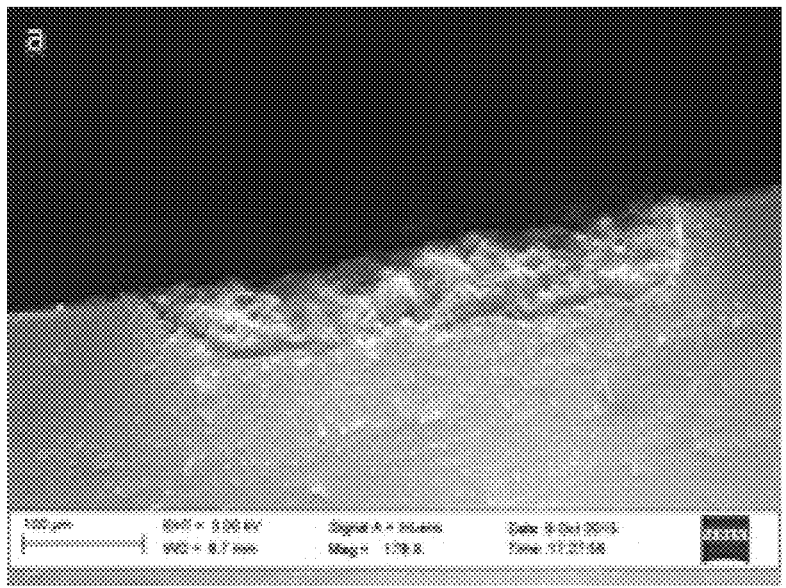
FIGS. 23(a), 23(b), 23(c), 23(d) show cathode spot regions from FIG. 22 viewed with a scanning electron microscope in Region 1 (FIG. 23(a)), Region 2 (FIG. 23(b)), and Region 3 (FIGS. 23(c), (d)).
Figure 23B:
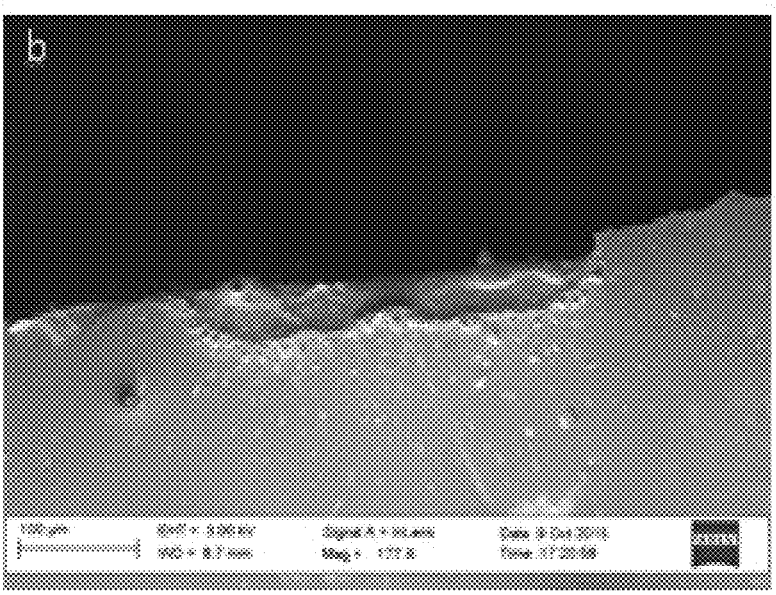
Figure 23C:
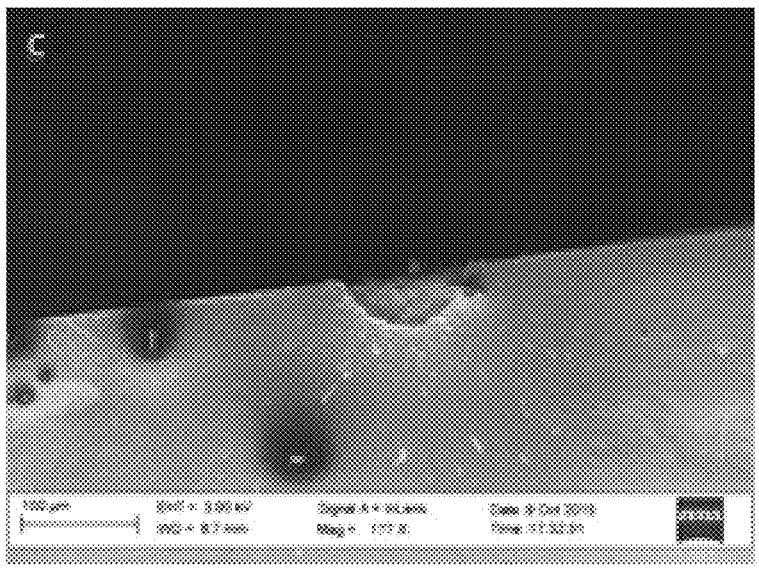
Figure 23D:
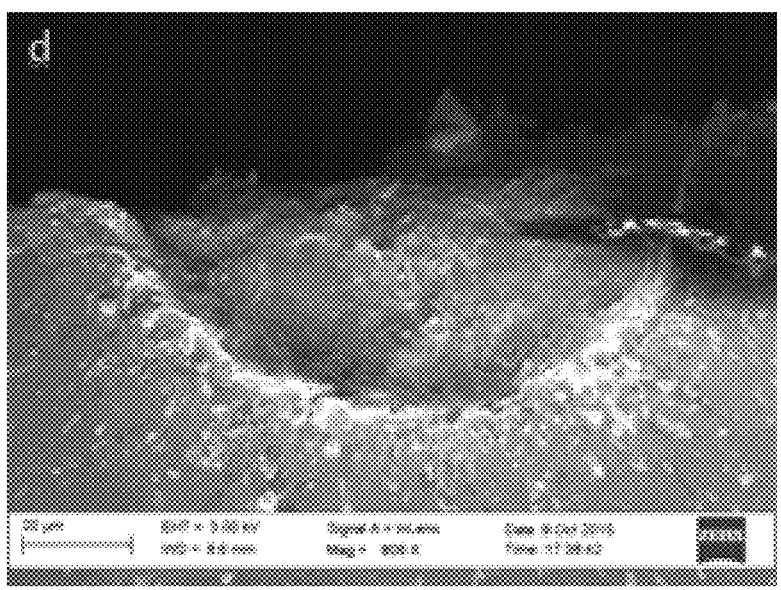

After a consistent arc was achieved in atmosphere the embodiment was repeated in a vacuum of $3.5 \times 10^{-5}$ torr. After approximately 128 pulses (see FIG. 20) three spot regions were observed on the edge of the cell as shown in FIG. 21. 100 µs 20 A peak current pulses were used from the power processing unit as shown in FIG. 22 at a setting of 20 V. FIGS. 23(a)-23(d) show several images of the cathode spot regions taken with a scanning electron microscope.

Combined with the earlier silicon embodiments, which established that the cathode spot on semiconductors can be relocated, this demonstration of continuous arcing on a space qualified solar array paves the way for future work aimed at achieving an end-of-life maneuver on a satellite using the vehicle's own solar arrays.

As described and shown in the illustrative non-limiting examples above, the invention is especially useful for a satellite, and specifically a CubeSat. And the invention is particularly well-suited for use with a solar panel acting as a cathode. However, it will be apparent that the invention can be utilized in other applications, either for a satellite or other device, and with or without a solar panel. For instance, the invention can utilize different components of the CubeSat, other than the solar panel, as a cathode for arc generation. For example, the invention can utilize the satellite housing, body, frame, or operational components or equipment (such as for communication, imaging and/or sensing) as a cathode. Or the invention can have more than two lines selectively coupled by a switch to different parts of the satellite.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A satellite comprising:
    a solar cell; and
    an arc propulsion system comprising a power source, a first lead coupled to the power source and to a cathode, a second lead coupled to the power source and to an anode, and an insulator between the cathode and the anode, wherein the solar cell forms the cathode.

2. The satellite of claim 1, further comprising a third lead coupled to the power source and to the cathode, wherein the first lead is coupled to a first portion of the cathode and the third lead is coupled to a second portion of the cathode different than the first portion.

3. The satellite of claim 1, further comprising a coil at least partly surrounding at least a portion of the cathode and/or anode.

4. The satellite of claim 3, wherein the coil forms a magnetic field.

5. The satellite of claim 1, wherein the satellite comprises a CubeSat that is launched without use of the arc propulsion system.

6. The satellite of claim 1, wherein the arc propulsion system is activated at the end of life of the satellite to de-orbit the satellite.

7. The satellite of claim 1, wherein the solar cell comprises silicon or gallium arsenide and forms propellant for the propulsion system.

8. The satellite of claim 1, further comprising an electric field in the cathode.

9. A satellite comprising:
    a solar cell comprising a cathode; and
    an arc propulsion system comprising a power source, a first lead coupled to the power source and to the cathode, a second lead coupled to the power source and to an anode, and a third lead coupled to the power source and to the cathode, wherein the first lead is coupled to a first portion of the cathode and the third lead is coupled to a second portion of the cathode different than the first portion.

10. The satellite of claim 9, further comprising a coil at least partly surrounding at least a portion of the cathode and/or anode.

11. The satellite of claim 10, wherein the coil forms a magnetic field.

12. The satellite of claim 9, wherein the satellite comprises a CubeSat that is launched without use of the arc propulsion system.

13. The satellite of claim 9, wherein the arc propulsion system is activated at the end of life of the satellite to de-orbit the satellite.

14. The satellite of claim 9, wherein the solar cell comprises silicon or gallium arsenide and forms propellant for the propulsion system.

15. The satellite of claim 9, further comprising an electric field in the cathode.

16. The satellite of claim 9, further comprising an insulator between the cathode and the anode.

* * * * *